US009680649B2

(12) United States Patent
Nabeel

(10) Patent No.: US 9,680,649 B2
(45) Date of Patent: Jun. 13, 2017

(54) POLICY-BASED KEY SHARING

(71) Applicant: Oracle International Corporation, Redwood Shores, CA (US)

(72) Inventor: Mohamed Nabeel, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 77 days.

(21) Appl. No.: 14/663,379

(22) Filed: Mar. 19, 2015

(65) Prior Publication Data

US 2016/0277187 A1    Sep. 22, 2016

(51) Int. Cl.
G06F 21/62    (2013.01)
H04L 9/30    (2006.01)
H04L 9/08    (2006.01)

(52) U.S. Cl.
CPC ............ H04L 9/3093 (2013.01); H04L 9/085 (2013.01); H04L 9/088 (2013.01)

(58) Field of Classification Search
CPC ...... H04L 9/3093; H04L 9/14; H04L 2209/24
USPC ........................................................ 380/44
See application file for complete search history.

(56) References Cited

U.S. PATENT DOCUMENTS

| 8,423,764 | B2* | 4/2013 | Amendola | .............. H04L 9/088 |
| | | | | 713/158 |
| 2004/0162906 | A1* | 8/2004 | Griffin | ................ G06F 21/6218 |
| | | | | 709/229 |
| 2012/0314854 | A1* | 12/2012 | Waters | .................. H04L 9/3073 |
| | | | | 380/28 |
| 2014/0201520 | A1* | 7/2014 | Yacobi | .................. H04L 9/3073 |
| | | | | 713/158 |

* cited by examiner

Primary Examiner — Amir Mehrmanesh
Assistant Examiner — Sakinah Taylor
(74) Attorney, Agent, or Firm — Hickman Palermo; Becker Bingham LLP

(57) ABSTRACT

Methods of providing policy based access to master keys, enabling keys to be distributed to groups of users in a secure manner while minimizing disruptions to the user in the event of changes to group membership or changes to user attributes. User attributes are identified. Policies are rewritten in terms of user attributes. New unique user attribute keys are generated for each attribute for each user. An access tree is constructed with user attribute keys as leaf nodes and Boolean algebra operations as internal nodes. Shamir polynomials are used for AND nodes, and broadcast polynomials are used for OR nodes. Master keys are accessible by traversing the access tree from the leaf nodes to the root node constructing the polynomials attached to all the nodes along the access path.

24 Claims, 5 Drawing Sheets

POLICY-BASED KEY SHARING

FIELD OF THE INVENTION

The present invention relates to policy-based key sharing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In large organizations, passwords and other keys are often generated and distributed by the system administrator to other users. The system administrator can accomplish this by giving the keys to the relevant users based on their roles. However, the drawback of this approach is that if a key is compromised by one user, the key needs to be changed and redistributed to all the affected users. Similarly, if a user leaves the organization or changes roles, the key needs to be changed and given to all the affected. This requires many keys to be stored and is computationally expensive. Moreover, there are security risks involved in having many users share the same key.

A need exists for a policy-based key sharing method that maintains secrecy and security while minimizing disruption to users.

DETAILED DESCRIPTION

In the following description, for the purpose of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Described herein is an approach for policy and attribute-based control to keys or passwords. For each a given group of users of a system, attributes are identified, and an attribute set is generated. An attribute can correspond to a role that the user has in the system, such as Database Administrator (DBA). A key sharing policy is a combination of such attributes that governs access to a particular key, with the particular combination of attributes expressible using Boolean algebra. For example, a key sharing policy expressed as: "access granted to all DBAs, as well as Managers" can be written using Boolean algebra as "DBA OR Manager". New user attribute keys are generated, and each user is assigned a unique key for each of their attributes, such that the same attribute for different users is assigned a different key.

An access tree is constructed for each key sharing policy based on the Boolean expression of the user attributes and the user attribute keys assigned to each user for the attributes. The construction of the access tree associates the access tree with a master key. The user attribute keys of a user having attributes that satisfy the policy, when evaluated against the access tree, unlock (i.e. yield) the master key. If a user attribute key is changed or invalidated, or a new user key is added, the access tree can be recomputed on the new set of valid user attribute keys without changing any other user attribute key of other users.

Figure 1:
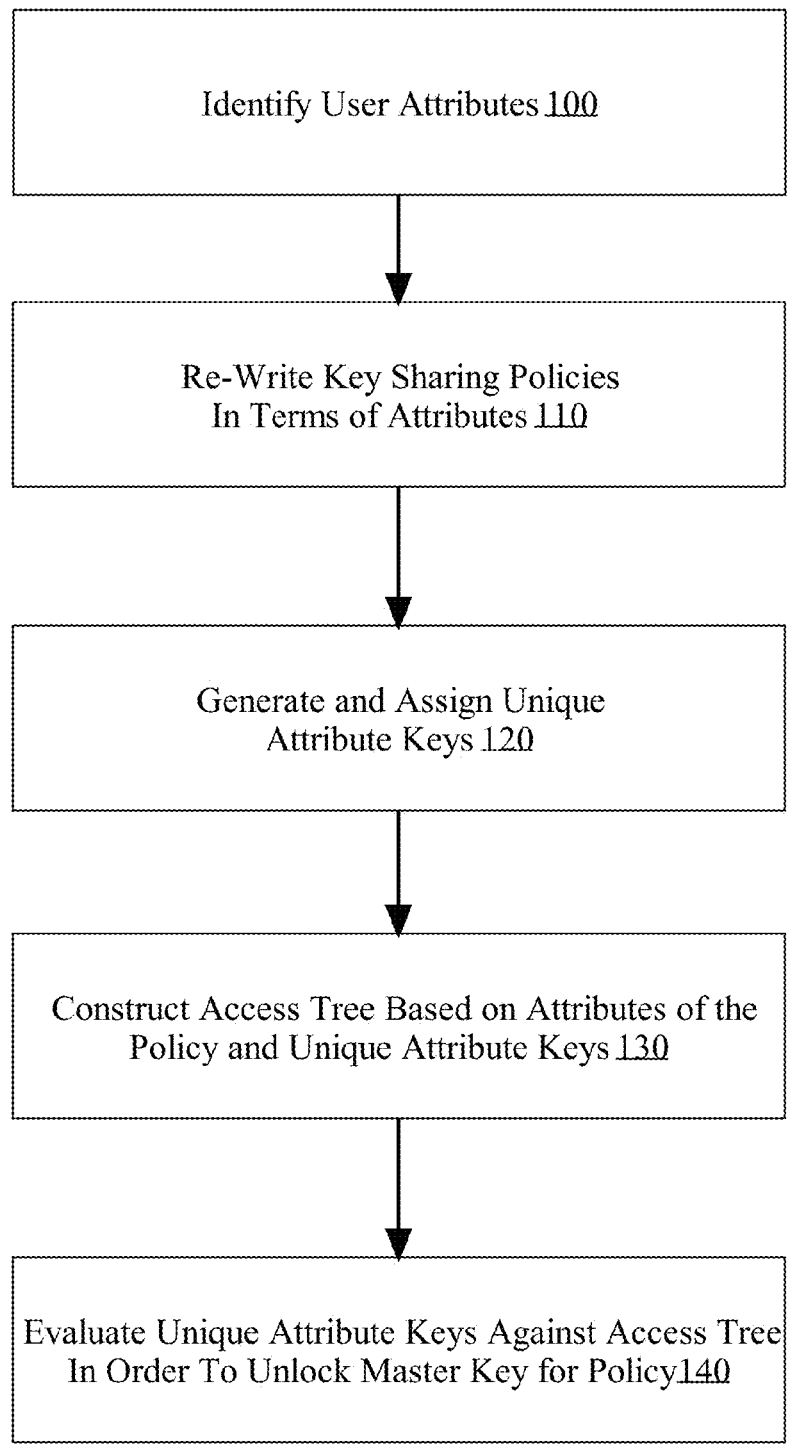
FIG. 1 is a flow chart depicting an embodiment of the presently disclosed method.

FIG. 1 depicts a flow chart of an embodiment of the presently disclosed approach. At step 100, a set of users is identified along with each of their attributes. In an embodiment, an attribute can be a role that a user performs within a system. In another embodiment, an attribute can be a user group that the user belongs to. The system identifies and compiles an attribute universe comprising all attributes for all of the users in the system.

At step 110, each key sharing policy is rewritten in terms of the attributes gathered at step 100. In one embodiment, a key sharing policy is a rule or a set of rules that determines which users are permitted to access to which keys. In an embodiment, a key sharing policy can be expressed using Boolean algebra to relate the attributes to each other, as explained in greater detail below.

At step 120, each user is assigned a unique user attribute key for each of the user's attributes. In one embodiment, a user attribute key is a password that is automatically generated. In another embodiment, a user attribute key is generated by a system administrator. For example, User 1 has the attributes of System and DBA, and User 2 has the attributes of Application and DBA. For User 1, Key11 and Key12 are generated for attributes System and DBA, respectively; for User 2, Key21 and Key22 are generated for attributes System and DBA. Even though both users have the same attribute DBA, each is assigned a unique user attribute key for DBA.

At step 130, for each key sharing policy, an access tree is constructed based on the attributes of the policy and unique user attribute keys assigned in step 120 for each attribute of the key sharing policy.

At step 140, for a given key sharing policy and user, user attribute keys of the user are evaluated against the access tree for that key sharing policy. Only if the user holds valid user attribute keys, then the evaluation unlocks the master key associated with access tree and policy.

Constructing the Access Tree

An access tree is constructed for each key sharing policy based on a Boolean expression representing each key sharing policy, the attributes of the key sharing policy, and the user attributes keys for these attributes. Each internal node in the access tree represents either an AND gate or an OR gate. In an embodiment, the access tree is a tree that comprises leaf nodes and internal nodes. Each internal node of the tree represents a "Boolean polynomial". The leaf nodes are represented by a "broadcast polynomial".

A Boolean polynomial is associated with two or more input keys and a constant referred to as the Boolean polynomial's constant. According to an embodiment, there are at least two types of "Boolean polynomials", an AND Boolean polynomial and an OR Boolean polynomial.

For an AND Boolean polynomial, applying the AND Boolean polynomial to all the input keys yields a particular constant, which in effect is a key. There is a negligible probability that applying another pair of keys yields a constant that is same as the key. Thus, without the original two input keys with which a constant was generated by application of an AND Boolean polynomial, an attacker in effect cannot yield the same constant.

For an OR Boolean polynomial, applying the OR Boolean polynomial to at least one of the input keys yields a constant, which is equivalent to a key. There is a very low probability that applying a key that does not include the set of input keys yields this constant.

An example of a Boolean polynomial is a Shamir polynomial associated with two or more input keys. A Shamir polynomial can only be successfully evaluated if all of the required input keys are presented as input. If one or more keys are absent, the Shamir polynomial will not evaluate and produce a correct resultant key. There is a negligible probability that the Shamir polynomial will yield a key despite one or more of the input keys being absent or incorrect.

A broadcast polynomial is a polynomial that associated with a set of input keys and a constant referred to as the broadcast polynomial's constant. When any single input key in the set is evaluated against the broadcast polynomial, the broadcast polynomial evaluates to the broadcast polynomial's constant. There is a negligible probability that applying a random key not in the set yields the broadcast polynomial's constant.

Based on Boolean polynomials and broadcast polynomials, the inner nodes and leaf nodes of an access tree are used to represent, at least in part, a key sharing policy. An exemplary access tree is depicted in FIG. 2.

Figure 2:
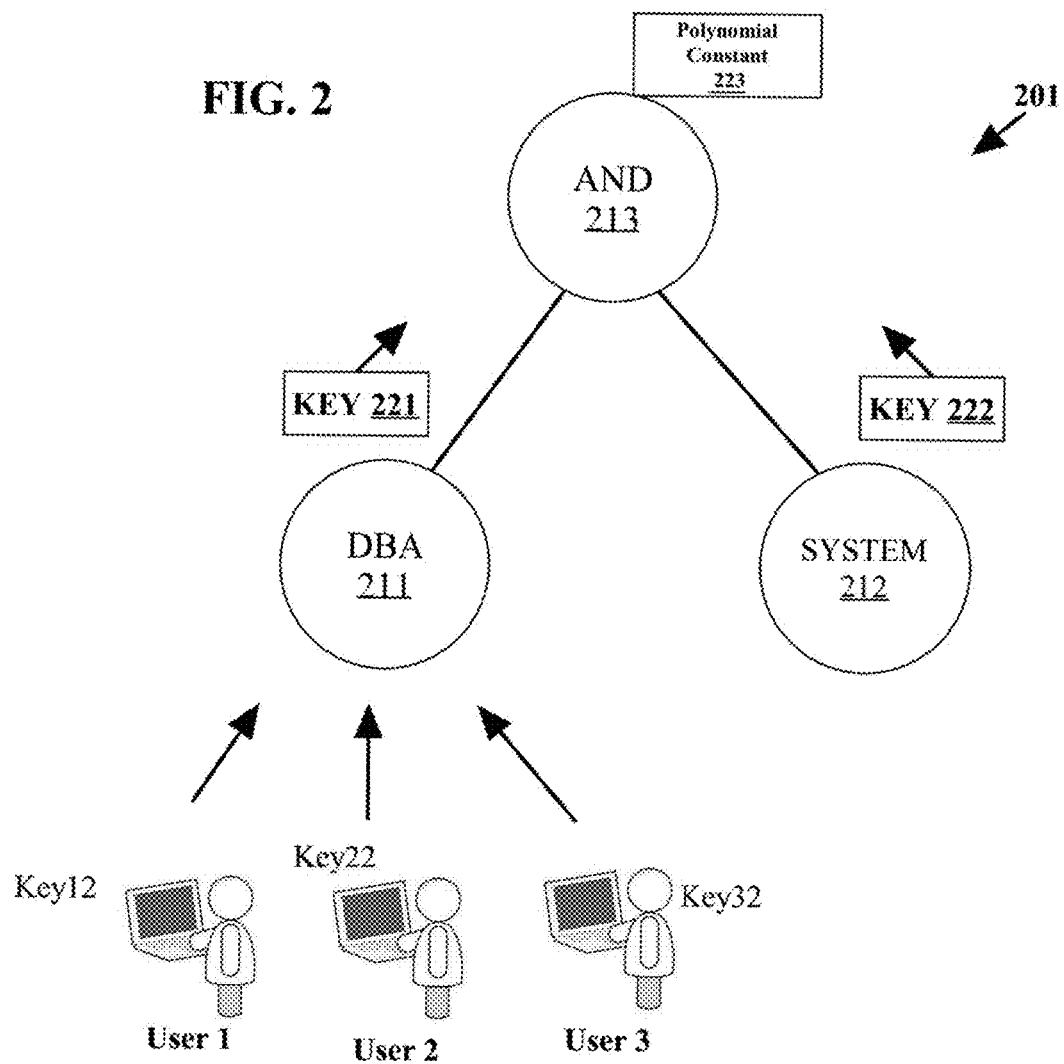
FIG. 2 is a schematic diagram depicting an access tree according to the presently disclosed method.

Referring to FIG. 2, it depicts access tree 201. Access tree 201 represents the key sharing policy "DBA AND SYSTEM", as expressed using Boolean algebra. The policy indicates that only System DBAs can access the key that the AND node represents through the Boolean polynomial.

The inner node 213 represents an AND Boolean polynomial having polynomial constant 223 based on input keys Key 221 and Key 222. For access tree 201, Key 221 and 222 represent valid DBA and SYSTEM attributes.

Access tree 201 comprises leaf node 211 and leaf node 212. Leaf node 211 and leaf node 212 are each represented by a broadcast polynomial used to generate a key representing the DBA and SYSTEM attributes, respectively. When evaluating an access tree 201 against a user, the broadcast polynomial of leaf node 211 is applied to the DBA user attribute key for the user to yield an intermediate key and the broadcast polynomial of leaf node 212 is applied to the SYSTEM user attribute key for the user to yield another intermediate key. The intermediate keys yielded in effect become the input to the AND Boolean polynomial of inner node 213. The AND Boolean polynomial of inner node 213 is evaluated using these intermediate keys as input. If the evaluation yields the correct polynomial constant 223, the intermediate keys Key221 and Key222 are valid, and the DBA and SYSTEM user attribute keys for the user are valid user key attributes for DBA and SYSTEM.

In access tree 201, the broadcast polynomial of leaf node 211 is generated such that any of the user attribute keys for an attribute yield the respective input key for the AND Boolean polynomial of leaf node 213. For example, User 1, User 2, and User 3 have the DBA attribute, and are assigned the user attribute keys Key12, Key22, and Key32, respectively. The broadcast polynomial for leaf node 211 is generated such that when any of the user attribute key Key12, Key22, and Key32 is applied to the broadcast polynomial, Key 221 is unlocked.

The security of the approach mentioned in the present invention relies on the randomness of attribute keys, intermediate keys and master keys. A cryptographically secure pseudo-random number generator is used to generate these keys so that attackers have a negligible probability of guessing the keys.

Sample Scenario

Figure 3A:
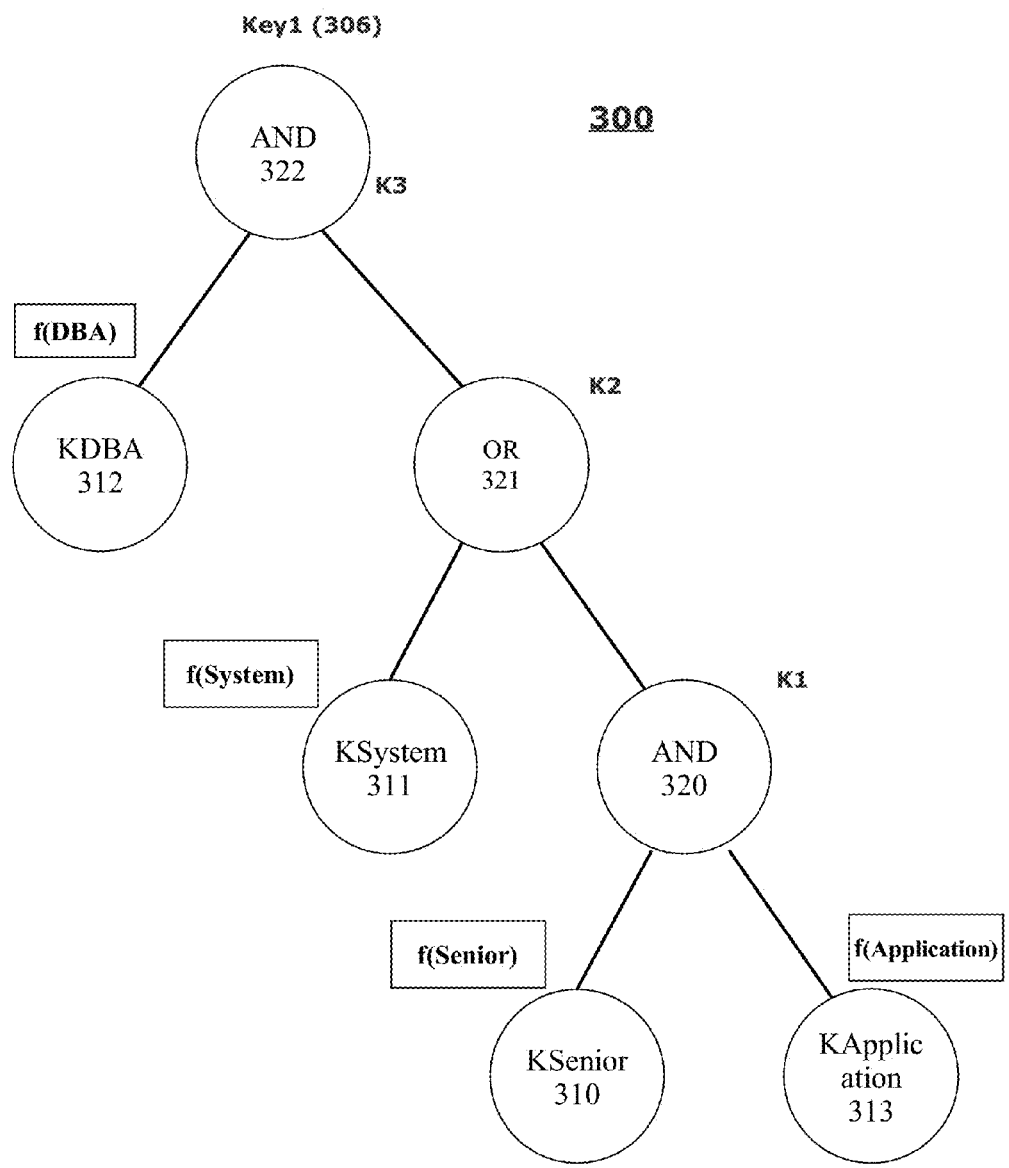
FIG. 3(a) is a schematic diagram depicting an access tree according to the presently disclosed method.
Figure 3B:
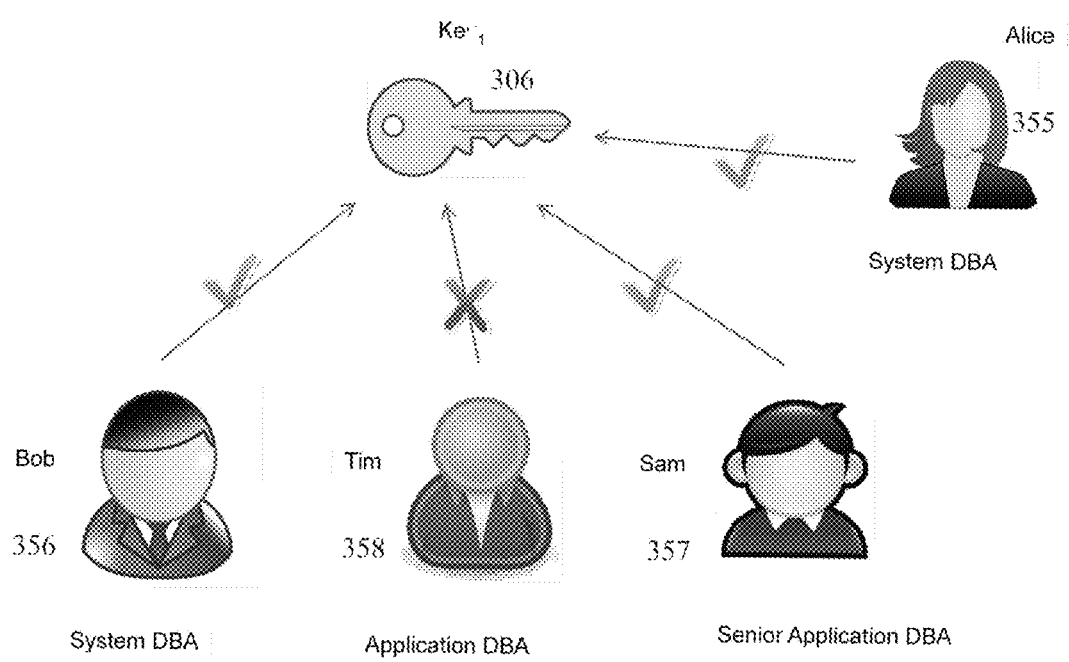
FIG. 3(b) is a schematic diagram depicting a group of users governed by a key sharing policy.

A sample scenario in accordance with an embodiment of the present invention will now be described with reference to the flow diagram shown in FIG. 1. FIG. 3(a) depicts a sample constructed access tree 300 for a key sharing policy "Policy1" that determines access to key 306. Policy 1 specifies that either System DBAs or Senior Application DBAs have access to the master key. Leaf nodes 310, 311, 312, and 313 represent broadcast polynomials, which have associated functions f(Senior), f(System), f(DBA), and f(Application), respectively, each function representing the implementation of the polynomial of its associated node. Internal nodes 320, 321 and root node 322 represent Boolean polynomials. Keys K1, K2, K3 are intermediate keys that result from successfully solving the polynomial with the associated node. Intermediate keys K1, K2, K3 may then serve as inputs to the Boolean polynomials at the next level of the access tree. FIG. 3(b) depicts a schematic of a sample group of users.

The sample user group consists of Alice 355, Bob 356, Sam 357, and Tim 358. In the sample group, Alice and Bob are System DBAs, Sam is a Senior Application DBA, and Tim is an Application DBA. In the sample scenario, Policy1 states that key 306 is accessible to System DBAs or Senior Application DBAs. In the sample group, therefore, Alice, Bob and Sam are authorized to derive key 306, while Tim is not authorized.

With reference to step 100 of FIG. 1, all the attributes for all of the users in the group are identified. In the sample scenario, Alice and Bob have the attributes of System and DBA. Sam has the attributes of Senior, Application and DBA. Tim has the attributes of Application and DBA. In the sample group, the set of attributes is identified as System, Senior, Application, and DBA.

With reference to step 110 of FIG. 1, the key access policy is rewritten in terms of the attributes identified at step 100. In the sample group, Policy1 evaluates to key 306 for System DBAs or for Senior Application DBAs. As before, System DBAs have the attributes of System and DBA, and Senior Application DBAs have the attributes of Senior, Application, and DBA. Therefore, the policy governing access to key 306 can be expressed in terms of attributes as: "DBA AND (System OR (Senior AND Application)".

With reference to step 120 of FIG. 1, each user is assigned a unique attribute key for each of the attributes associated with that user. These keys can be referred to generically as K(attribute,user). In the sample group, Bob is assigned user attribute keys K(DBA, Bob) and K(System, Bob). Alice is assigned user attribute keys K(DBA, Alice) and K(System, Alice). Tim is assigned user attribute keys K(DBA, Tim) and K(Application, Tim). Sam is assigned user attribute keys K(DBA, Sam), K(Application, Sam), and K(Senior, Sam).

With reference to step 130 of FIG. 1, access tree 300 is constructed for Policy1 based on the attributes of the policy and the unique attribute keys. In the access tree, leaf nodes 310, 311, 312, 313 and internal node 321 are implemented as broadcast polynomials that produce intermediate keys KSenior, KSystem, KDBA, KApplication and K2 respectively as output. Internal nodes 320, and 322 are implemented as Boolean polynomials that produce intermediate keys K1 and K3 respectively as output.

With reference to step 140 of FIG. 1, unique attribute keys may be evaluated against access tree 300 to determine whether said attribute keys satisfy Policy1 and thereby yield key 306. Evaluating attribute keys against the access tree is performed by traversing the access tree in a "bottom-up" fashion, beginning with the leaf nodes and proceeding towards the root node, solving and discovering the constant values, i.e. intermediate keys, for the polynomials attached to each node of the tree. Successfully evaluating the access tree in this manner will thereby satisfy Policy1 and yield the intermediate key assigned to the root node, K3. A simple decryption using key K3 yields the master key 306.

Referring back to the sample group of users, suppose that Bob wishes to derive key 306. Bob has user attribute keys K(DBA, Bob) and K(System, Bob). Intermediate key K2 can be derived using Bob's user attribute key K(System, Bob) as input to the broadcast polynomial at node 321. Following that step, intermediate key K2 can be used together with key K(DBA, Bob) as the two inputs to the AND Boolean polynomial at root node 322 to obtain intermediate key K3. Key 306 is then obtained by a simple description using the intermediate key K3.

To further illustrate using the sample scenario, suppose that Tim wishes to derive key 306. As before, Tim has user attribute keys K(DBA, Tim) and K(Application, Tim). However, Tim lacks a valid key for the Senior attribute, and, therefore cannot obtain intermediate key K1. Since he cannot evaluate access tree 300 correctly, Tim cannot obtain key 306.

Key Management

An organization may have many different keys that are associated with many different sharing policies. The following examples will illustrate the manner in which the presently disclosed approaches simplify and improve the management of keys.

In an embodiment, a user may leave the organization or change roles requiring their access to a particular key to be revoked. Referring to the sample scenario above, suppose that the Alice's access to key 306 is revoked. Alice is a System DBA having the attributes of System and DBA. To effect the change, keys K(DBA) and K(System) and their associated broadcast polynomials at leaf nodes 311 and 312 are updated with newly generated keys. Their associated broadcast polynomials f(DBA) and f(System) are also updated to reflect the change. The changes are propagated to internal nodes 321 and 322. The changes affect only the public information about the access tree available to all users and do not affect attribute keys possessed by other existing users.

In an embodiment, a user may be added to the organization or change roles requiring them to be granted access to a particular key. Referring to the sample scenario above, suppose new user Eve, who is a Senior Application DBA, having the attributes of Senior, Application, and DBA, is to be added. New user attribute keys are generated for each of Eve's attributes—keys K(DBA, Eve), K(Senior, Eve), and K(Application, Eve). The associated broadcast polynomials f(DBA), f(Senior), and f(Application) are updated with the new user attribute keys. Key 306 can be derived by evaluating Eve's attribute keys against the access tree 300 as detailed above. The changes affect only the public information about the access tree available to all users and do not affect attribute keys possessed by other existing users.

More generally, if there is any change to a leaf node, for example because a user is removed or a user is added, the access tree is recomputed by updating the affected leaf node, as well as any nodes and associated polynomials and intermediate keys that are on the path between the affected node and the root node. The remainder of the tree can stay the same. It may be preferable to update the master key for a policy when a user is added or removed, but it is not required.

In an embodiment, key 306 must be changed or updated, for example because it was compromised. Referring to the sample scenario above, key 306 may be updated as needed without any change required to the associated access tree or intermediate keys or user attribute keys by simply generating a new key and encrypting it with key K3.

In an embodiment, a user attribute key must be replaced, for example because it has been compromised. To update the access tree, a new user attribute key is generated. The associated broadcast polynomial for the relevant leaf node is updated, as well as any intermediate keys along the path from the leaf node to the root node. Referring to the sample scenario above, suppose that user attribute key K(DBA, Alice) must be replaced. A new key is generated, and the corresponding broadcast polynomial f(DBA) is updated. Finally, key K(DBA) and the associated broadcast polynomial at leaf node 312 and the Boolean polynomial at internal node 322 are also updated to reflect the change. The changes affect only the public information about the access tree available to all users and do not affect attribute keys possessed by other existing users.

Hardware Overview

Figure 4:
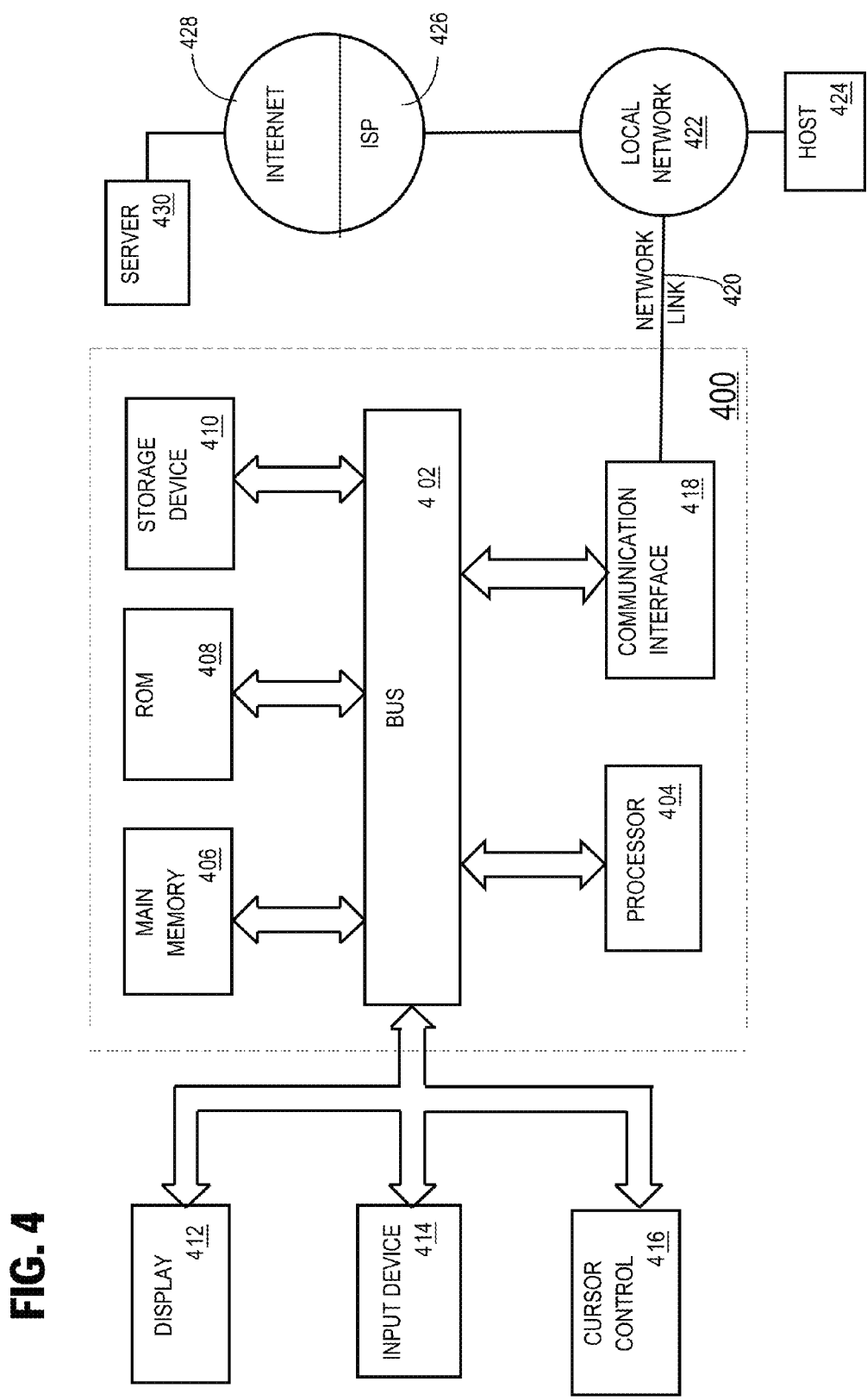
FIG. 4 is a diagram depicting a computer system that may be used in an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for policy-based key sharing. According to one embodiment of the invention, policy-based key sharing is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for policy based key sharing as described herein.

The received code may be executed by processor 404 as it is received, and/or stored in storage device 410, or other non-volatile storage for later execution. In this manner, computer system 400 may obtain application code in the form of a carrier wave.

The invention claimed is:

1. A method comprising:
   storing a collection of attributes in association with users, each user of said users being associated with at least one attribute of said collection of attributes;
   for each attribute of said collection of attributes, generating a respective set of user attribute keys that each correspond to said each attribute of the said collection of attributes, each user attribute key of said respective set of user attribute keys corresponding to a user of said users that is different than any other user of said users;
   storing a policy that is based on a plurality of attributes of said collection of attributes;
   generating an access tree for said policy, said access tree being associated with a master key, said access tree comprising:
      leaf nodes, each leaf node of said leaf nodes being associated with a respective attribute of said plurality of attributes and a respective broadcast polynomial, the respective broadcast polynomial being based on the respective set of user attribute keys of said respective attribute, and
      a first inner node, said first inner node being associated with at least two leaf nodes of said leaf nodes and a first Boolean polynomial based on each respective broadcast polynomial of said at least two leaf nodes; and
   for a first user of said users, evaluating said access tree to determine whether a first set of user attribute keys of said first user evaluate to said master key, each user attribute key of said first set of user attribute keys corresponding to an attribute of said plurality of attributes.

2. The method of claim 1, making a change to a certain user attribute key corresponding to the respective attribute of a leaf node of said at least two leaf nodes;
   after changing said certain user attribute key, regenerating said access tree to generate a new access tree;
   for a second user of said users, evaluating said new access tree to determine whether a second set of user attribute keys of said second user evaluate to said master key, each user attribute key of said second set of user attribute keys corresponding to an attribute of said plurality of attributes.

3. The method of claim 1, wherein said policy is based on a Boolean expression of said plurality of attributes, said Boolean expression specifying a Boolean relationship between a first attribute of said plurality of attributes and a second attribute of said plurality of attributes.

4. The method of claim 1, wherein said policy is based on a Boolean expression of said plurality of attributes, said Boolean expression specifying a first Boolean relationship between a first attribute of said plurality of attributes and a second attribute of said plurality of attributes;
wherein said first Boolean polynomial reflects said first Boolean relationship between said first attribute of said plurality of attributes and said second attribute of said plurality of attributes.

5. The method of claim 4, wherein said first Boolean relationship is a Boolean OR.

6. The method of claim 4, wherein said first Boolean relationship is a Boolean AND.

7. The method of claim 4, wherein said first Boolean polynomial is a Shamir polynomial.

8. The method of claim 1, wherein evaluating said access tree further comprises generating one or more intermediate keys;
wherein each of the one or more intermediate keys is a result of the broadcast polynomial associated with a leaf node of said leaf nodes;
wherein each of the one or more intermediate keys is an input to the Boolean polynomial associated with the first inner node.

9. The method of claim 1,
making a change to a certain user attribute key corresponding to the respective attribute of a particular leaf node of said at least two leaf nodes;
updating said access tree by at least:
updating the respective broadcast polynomial of said particular leaf node, and
updating said Boolean polynomial associated with said first inner node.

10. The method of claim 1,
removing a certain user attribute key from the respective set of user attribute keys corresponding to the respective attribute of a particular leaf node of said at least two leaf nodes; and
updating said access tree by at least:
updating the respective broadcast polynomial of said particular leaf node, and
updating said Boolean polynomial associated with said first inner node.

11. The method of claim 1,
adding a certain user attribute key to the respective set of user attribute keys corresponding to the respective attribute of a particular leaf node of said at least two leaf nodes; and
updating said access tree by at least:
updating the respective broadcast polynomial of said particular leaf node, and
updating said Boolean polynomial associated with said first inner node.

12. One or more non-transitory storage media storing instructions which, when executed by one or more computing devices, cause performance of:
storing a collection of attributes in association with users, each user of said users being associated with at least one attribute of said collection of attributes;
for each attribute of said collection of attributes, generating a respective set of user attribute keys that each correspond to said each attribute of the said collection of attributes, each user attribute key of said respective set of user attribute keys corresponding to a user of said users that is different than any other user of said users;
storing a policy that is based on a plurality of attributes of said collection of attributes;
generating an access tree for said policy, said access tree being associated with a master key, said access tree comprising:
leaf nodes, each leaf node of said leaf nodes being associated with a respective attribute of said plurality of attributes and a respective broadcast polynomial, the respective broadcast polynomial being based on the respective set of user attribute keys of said respective attribute, and
a first inner node, said first inner node being associated with at least two leaf nodes of said leaf nodes and a first Boolean polynomial based on each respective broadcast polynomial of said at least two leaf nodes; and
for a first user of said users, evaluating said access tree to determine whether a first set of user attribute keys of said first user evaluate to said master key, each user attribute key of said first set of user attribute keys corresponding to an attribute of said plurality of attributes.

13. The storage media of claim 12, wherein the instructions further include instructions for:
making a change to a certain user attribute key corresponding to the respective attribute of a leaf node of said at least two leaf nodes;
after changing said certain user attribute key, regenerating said access tree to generate a new access tree;
for a second user of said users, evaluating said new access tree to determine whether a second set of user attribute keys of said second user evaluate to said master key, each user attribute key of said second set of user attribute keys corresponding to an attribute of said plurality of attributes.

14. The storage media of claim 12, wherein said policy is based on a Boolean expression of said plurality of attributes, said Boolean expression specifying a Boolean relationship between a first attribute of said plurality of attributes and a second attribute of said plurality of attributes.

15. The storage media of claim 12,
wherein said policy is based on a Boolean expression of said plurality of attributes, said Boolean expression specifying a first Boolean relationship between a first attribute of said plurality of attributes and a second attribute of said plurality of attributes;
wherein said first Boolean polynomial reflects said first Boolean relationship between said first attribute of said plurality of attributes and said second attribute of said plurality of attributes.

16. The storage media of claim 15, wherein said first Boolean relationship is a Boolean OR.

17. The storage media of claim 15, wherein said first Boolean relationship is a Boolean AND.

18. The storage media of claim 15, wherein said first Boolean polynomial is a Shamir polynomial.

19. The storage media of claim 12, wherein evaluating said access tree further comprises generating one or more intermediate keys;
wherein each of the one or more intermediate keys is a result of the broadcast polynomial associated with a leaf node of said leaf nodes;

wherein each of the one or more intermediate keys is an input to the Boolean polynomial associated with the first inner node.

20. The storage media of claim 12 wherein the instructions further include instructions for:
    making a change to a certain user attribute key corresponding to the respective attribute of a particular leaf node of said at least two leaf nodes;
    updating said access tree by at least:
        updating the respective broadcast polynomial of said particular leaf node, and
        updating said Boolean polynomial associated with said first inner node.

21. The storage media of claim 12 wherein the instructions further include instructions for:
    removing a certain user attribute key from the respective set of user attribute keys corresponding to the respective attribute of a particular leaf node of said at least two leaf nodes; and
    updating said access tree by at least:
        updating the respective broadcast polynomial of said particular leaf node, and
        updating said Boolean polynomial associated with said first inner node.

22. The storage media of claim 12 wherein the instructions further include instructions for:
    adding a certain user attribute key to the respective set of user attribute keys corresponding to the respective attribute of a particular leaf node of said at least two leaf nodes; and
    updating said access tree by at least:
        updating the respective broadcast polynomial of said particular leaf node, and
        updating said Boolean polynomial associated with said first inner node.

23. The method of claim 8, wherein for each leaf node of said leaf nodes, a user attribute key of the set of user attribute keys is an input to the Broadcast polynomial associated with said each leaf node.

24. The storage media of claim 19, wherein for each leaf node of said leaf nodes, a user attribute key of the set of user attribute keys is an input to the Broadcast polynomial associated with said each leaf node.

* * * * *